United States Patent
O'Hagen (10) Patent No.: US 6,817,825 B1
(45) Date of Patent: Nov. 16, 2004

(54) LOAD TRANSFER SYSTEM FOR PICKUP TRUCK BED

(76) Inventor: Theodore R. O'Hagen, 2129 Freedom Blvd., Freedom, CA (US) 95019

( * ) Notice: Subject to any disclaimer, the term of this patent is extended or adjusted under 35 U.S.C. 154(b) by 98 days.

(21) Appl. No.: 10/037,747

(22) Filed: Nov. 9, 2001

(51) Int. Cl.$^7$ .................................................. B60P 1/04
(52) U.S. Cl. ........................ 414/477; 414/480; 414/494
(58) Field of Search ................................ 414/477, 478, 414/479, 480, 491, 494, 549; 298/1 A, 12

(56) References Cited

U.S. PATENT DOCUMENTS

| | | | | |
|---|---|---|---|---|
| 192,892 | A | * 7/1877 | Bateman | 298/12 |
| 595,056 | A | * 12/1897 | French | 298/12 |
| 2,977,011 | A | * 3/1961 | Okerlund | 414/477 |
| 3,450,437 | A | * 6/1969 | McQueen | 298/14 |
| 3,485,400 | A | 12/1969 | Pewthers | 214/505 |
| 3,630,571 | A | * 12/1971 | Saldana | 298/14 |
| 3,825,137 | A | * 7/1974 | Mackrill et al. | 414/498 |
| 4,225,281 | A | * 9/1980 | Bibeau et al. | 414/498 |
| 4,265,463 | A | 5/1981 | Perruso | 280/402 |
| 4,645,405 | A | 2/1987 | Cambiano | 414/494 |
| 4,647,110 | A | * 3/1987 | McKee | 298/1 A |
| 4,702,662 | A | 10/1987 | Marlett | 414/477 |
| 4,741,575 | A | * 5/1988 | Sloan | 298/12 |
| 4,880,346 | A | 11/1989 | Brassette | 414/486 |
| 4,988,258 | A | 1/1991 | Lutz et al. | 414/500 |
| 5,118,244 | A | 6/1992 | Cook | 414/528 |
| 5,246,329 | A | 9/1993 | Farrell | 414/478 |
| 5,383,714 | A | 1/1995 | Hunter | 298/17 R |
| 5,779,431 | A | 7/1998 | Alm et al. | 414/786 |
| 6,077,024 | A | * 6/2000 | Trueblood | 414/462 |
| 6,086,313 | A | 7/2000 | Plaehn | 414/515 |
| 6,099,232 | A | * 8/2000 | Dixon et al. | 414/494 |
| 6,158,761 | A | 12/2000 | King | 280/495 |
| 6,196,634 | B1 | 3/2001 | Jurinek | 298/1 A |
| 6,238,166 | B1 | 5/2001 | Collier | 414/436 |
| 6,276,890 | B1 | 8/2001 | Pratt | 414/477 |

FOREIGN PATENT DOCUMENTS

| EP | 336313 | * 10/1989 |
|---|---|---|
| GB | 2259688 | * 3/1993 |

* cited by examiner

*Primary Examiner*—James W. Keenan
(74) *Attorney, Agent, or Firm*—Mark Lauer; Silicon Edge Law Group LLP (57) ABSTRACT

A load transfer system for a pickup truck includes a frame mounted to the truck bed, a support member slidable in a rearward direction along the frame, a cargo bed slidable along the support member, and an arm that raises the front end of the cargo bed as the cargo bed slides in a rearward direction such that the cargo bed pivots about the rear edge of the support member. The arm raises the front end of the cargo bed as the arm is caught between a point towards the front of the cargo bed and a point further to the rear on the support member. The load transfer system is easy to install and/or remove from the bed or chassis of a vehicle, does not require costly hydraulic equipment, and can be used without removing the tailgate of the vehicle.

9 Claims, 8 Drawing Sheets

FIG. 8

LOAD TRANSFER SYSTEM FOR PICKUP TRUCK BED

BACKGROUND

Several types of dump mechanisms for pickup trucks have been proposed. Many of these dump mechanisms are difficult to install or remove from a vehicle, and require installation of accessories not only to the pickup truck bed, but also to other areas of the vehicle. Such additional accessories can include hydraulic equipment and hose connections that are attached to the engine, or hinges that are attached directly to the vehicle chassis. The cost of such hydraulic equipment can also be significant.

Some existing dump mechanisms also require a pickup truck's tailgate to be removed before the dump mechanism can be used. For example, the dump mechanism might have a fixed pivot axis about which the dump bed rotates, with the pivot axis affixed at the rear end of the chassis at the base of the truck tailgate. Unfortunately, unloaded material may be dumped onto the tailgate unless the tailgate is removed.

Other loading and unloading systems have platforms for raising cars onto tow trucks in which the towing platform slides and pivots over the rear end of the truck chassis to form a ramp. These tow truck mechanisms typically employ hydraulic equipment to push the towing platform off the truck. Because the towing platform must touch the ground, these tow truck mechanisms are unsuitable for dumping material while moving or for lowering boats into water.

SUMMARY

The problems identified above by the present inventor have been solved by a load transfer system that does not require hydraulic equipment, can be easily installed and/or removed in a single operation, and can be used without removing the tailgate of a pickup truck. In accordance with one embodiment, a vehicle such as a pickup truck or trailer is fitted with a cargo bed that can be moved in a rearward direction to clear an open truck tailgate before tilting the bed to unload any cargo. The unloading operation can be reversed if it is desired to load the cargo bed by sliding material up the inclined cargo bed. With this embodiment a conventional pickup truck can be converted into a dump truck. Alternatively, a vehicle can be manufactured to include an embodiment of the invention for loading or unloading the vehicle.

A mechanism for moving the cargo bed can include at least one arm having a first end coupled to the bed adjacent to a front end of the bed, and a second end of the arm coupled to the vehicle bed beneath the cargo bed. To unload cargo disposed on the cargo bed, the arm initially moves along with the cargo bed in a rearward direction along first portion of the vehicle bed, for example by sliding or rolling on wheels. After a back end of the cargo bed has cleared the vehicle bed and tailgate, the second end of the arm is caught, causing the arm to pivot about the second end, raising the front end of the cargo bed and dumping the load.

A support can be provided at the end of the vehicle or tailgate for supporting the weight of the load, and the cargo bed can pivot about the support. The support may be moveable to extend over an open tailgate when a load is being dumped, but retract to within the vehicle when the load is contained on the cargo bed. The pivot may be disposed approximately beneath the center of mass of the cargo bed and load, so that tilting the cargo bed is facilitated. The linear momentum acquired during substantially horizontal motion of the cargo bed in the initial rearward movement can be converted to angular momentum during pivoting, facilitating the lifting of the load. Stated differently, the arm acts like a pole vault stick to convert horizontal motion into a raising force. The entire load transfer process can be accomplished with simple machines such as wheels, lever arms, pulleys and inclined planes, obviating the need for hydraulic equipment. A cost-effective electrical winch can also augment the simple machines.

Other embodiments are also described below. This summary does not purport to define the invention. The claims, and not this summary, define the invention.

BRIEF DESCRIPTION OF THE DRAWINGS

FIGS. 1A–4A are side views of a pickup truck with its truck bed partially cut away to expose a load transfer system in accordance with one embodiment of the present invention.

FIGS. 1B–4B are the corresponding top plan views to FIGS. 1A–4A of the load transfer system.

DETAILED DESCRIPTION

FIGS. 1–8 show a load transfer system that can easily be installed and removed from a bed of a vehicle, does not require costly hydraulic equipment, and that can be used without removing a tailgate of the vehicle.

The load transfer method described herein may incorporate a sliding pivot axis, which need not be fixed with respect to any point on the chassis of the vehicle. A cargo bed slides over a rear edge of a support member, which itself extends rearwardly. The moving, sliding pivot axis enables the load transfer system to be used without removing the pickup truck tailgate and reduces the force required to lift the front end of the cargo bed by pivoting the cargo bed closer to its center of gravity. Throughout this specification, the terms "front" and "forward" denote a location and direction, respectively, toward the cab of the truck or vehicle, and "rear" and "rearward" denote a respective location or direction away from the cab.

Figure 1A:
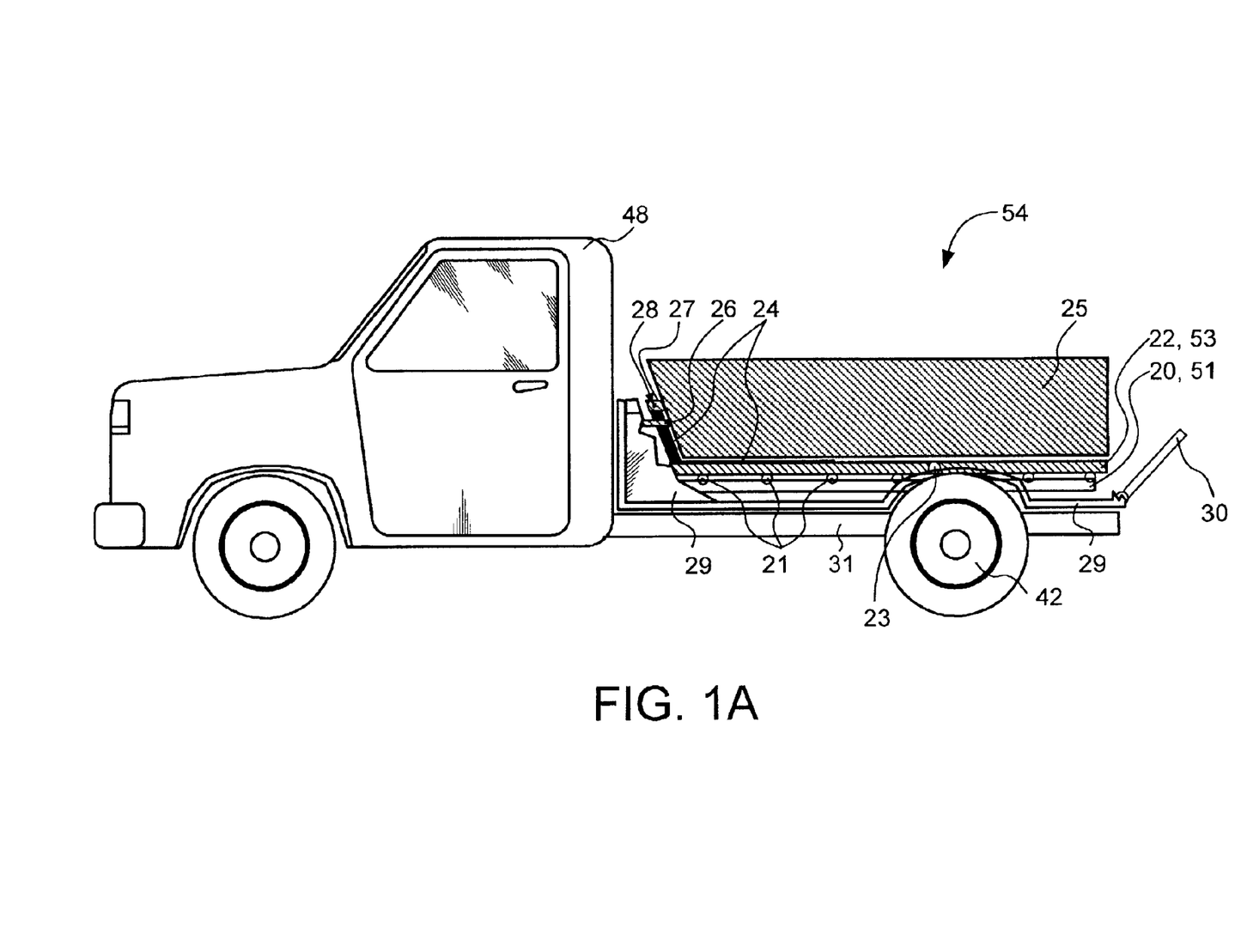
Figure 1B:
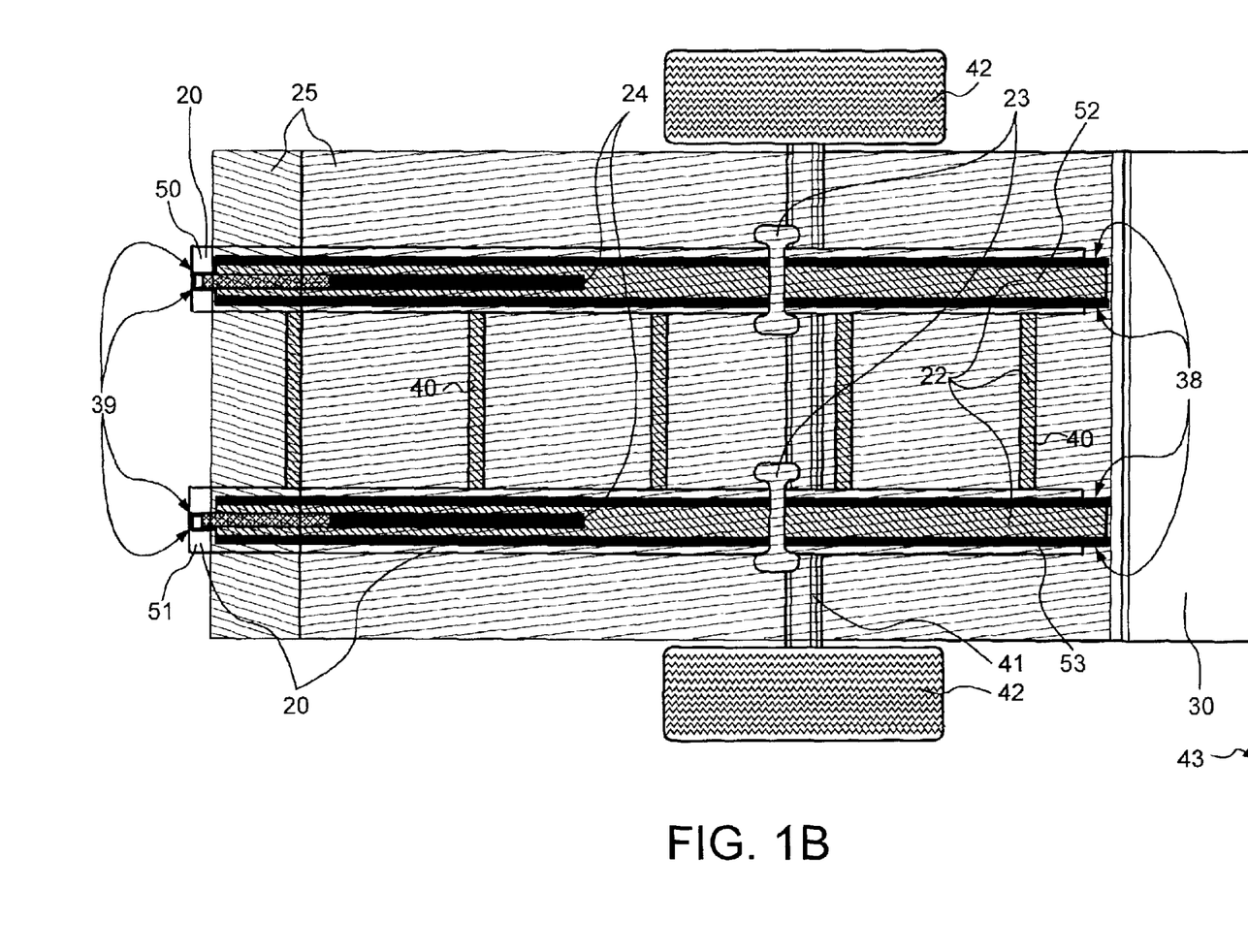

FIG. 1A is a diagram of a side view of a pickup truck 48 having a truck bed 29 partially cut away to expose a load transfer system 54 in a horizontal orientation, retracted within the truck bed 29. FIG. 1B is a corresponding top plan view of the load transfer system, together with a rear axle 41 and wheels 42 of the truck and a tailgate 30 of the truck 48. The tailgate 30 in both FIGS. 1A and 1B is in a half-open position, angled about 45° to horizontal. The load transfer system sits on and is attached to the truck bed 29, which is itself attached to the chassis 31 of the truck 48. A frame 20 of the load transfer system includes two grooved tracks, a starboard track 50 and a port track 51, that each can be attached to the truck by bolts or other fastening members, not shown, that pass through the truck bed 29 and attach to the chassis 31. The tracks 50 and 51 of the frame 20 are oriented parallel to each other in the lengthwise direction of the truck bed 29.

A movable support member 22 includes two slide rails, a starboard rail 52 and a port rail 53, the rails connected by cross members 40. The slide rails 52 and 53 of the support member 22 slide within grooves 39 that are part of the tracks 50 and 51 of the frame 20 and upon rollers 21 that roll within the tracks.

A movable cargo bed 25 rests upon the support member 22, the cargo bed having a front end, a rear end, an outer surface, an inner surface and a bottom surface. The cargo bed is movable in that it is slidable with respect to the support member 22 or truck bed 29. Two lifting arms 24, each arm having a front end and a rear end, slide within runners 38 that are located on the upper side of the two slide rails 52 and 53 of the support member 22. The lifting arms 24 are shaped like hockey sticks, with the long handle portions sliding in the runners 38. Shorter branches of the lifting arms 24 are pivotally attached at their front ends by pins 28 proximate to brackets 27. The brackets 27 are affixed to the outer surface of the front end of the cargo bed 25. Two guides 26 are affixed to the outer surface of the front end of the cargo bed 25 and form closed jackets through which the lifting arms 24 move as they rotate about the pins 28.

The lifting arms 24 can slide in the rearward direction in the runners 38 on the upper side of the support member 22 until their rear ends come to rest on catches 23. The catches 23 are illustrated in FIGS. 1B–4B as pins extending perpendicularly through the runners 38.

Although the cargo bed 25 is depicted in FIG. 1A with features such as sides and a flat bottom, not all features shown are necessary. For example, the cargo bed 25 need not have sides or a front wall; it can be a porous frame, such as the boat carrier 32 in FIG. 7. The lifting arms can have forms different than the form depicted in the figures. Moreover, a single or multiple lifting arms can be employed.

Figure 2A:
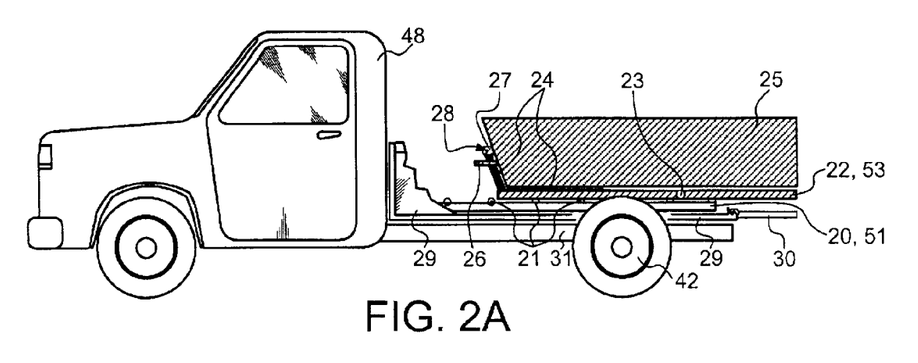
Figure 2B:
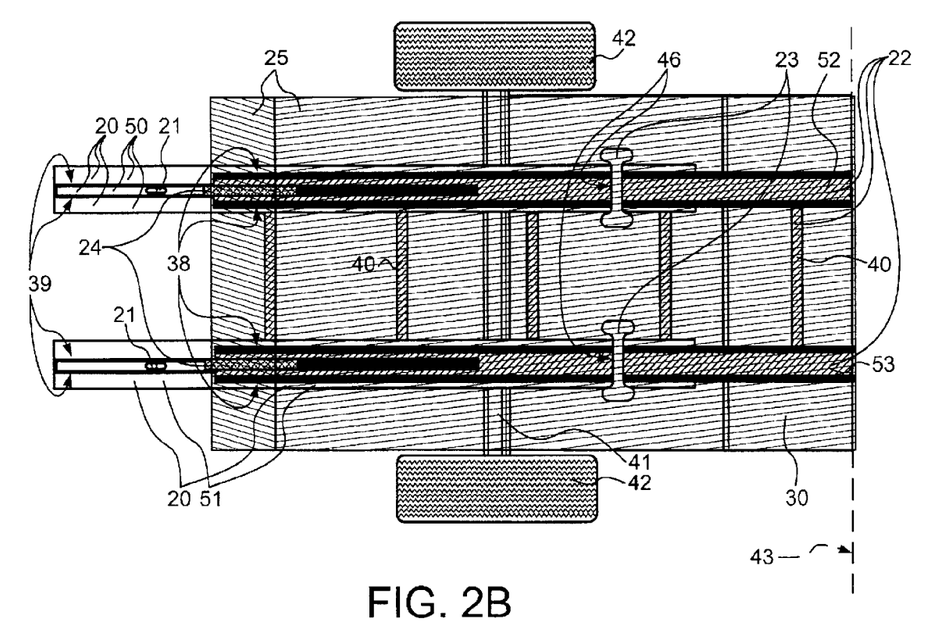

In FIG. 2A, the tailgate 30 is in a substantially horizontal and open position. The support member 22 has been extended in the rearward direction so that the rear ends of the slide rails 52 and 53 extend at least to the rearward most extent 43 of the open tailgate 30. The movable cargo bed 25 has not yet begun to slide rearwardly with respect to the support member 22. FIG. 2B is a corresponding top plan view to FIG. 2A.

Figure 3A:
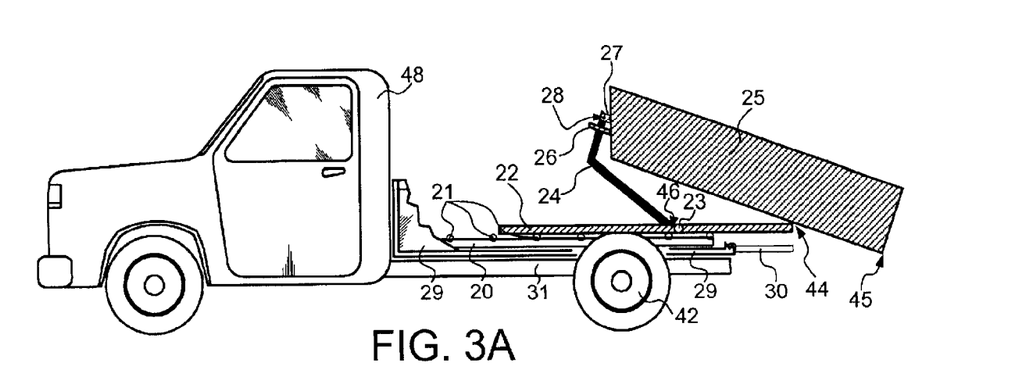
Figure 3B:
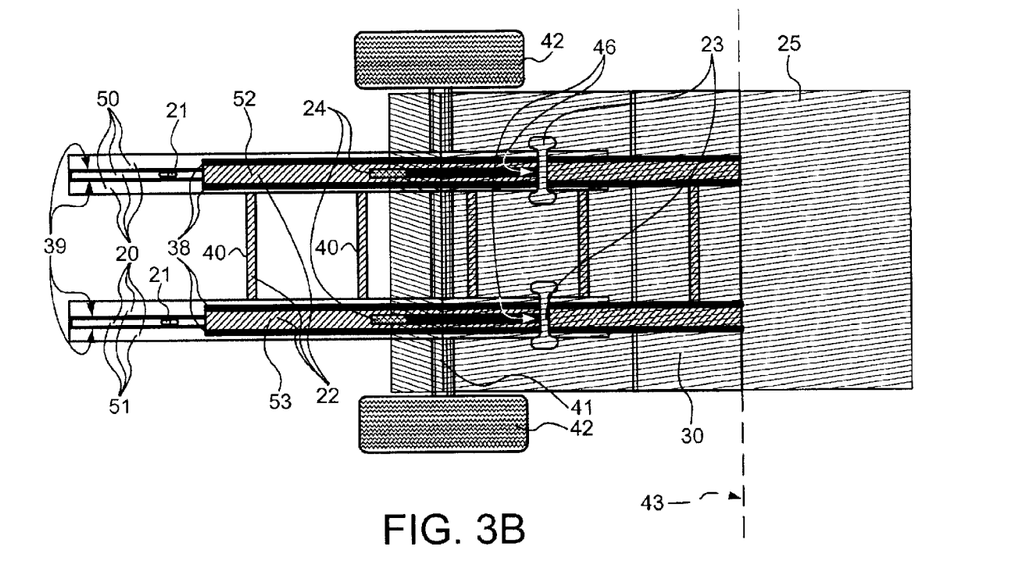

FIG. 3A shows the support member 22 in the same position as that shown in FIG. 2A. The cargo bed 25, however, has now moved rearwardly relative to the support member 22. In the embodiment illustrated in FIG. 3A, the cargo bed 25 slides rearwardly directly on the support member. In another embodiment, guides with rollers are attached lengthwise along the bottom surface of the cargo bed and glide within a second pair of tracks that are part of the frame 20 and located parallel to and on the outside of the illustrated tracks 50 and 51. The second pair of tracks provides added stability to the load transfer system by, among other things, ensuring that the cargo bed 25 does not slip in a direction parallel to a pivot axis 44 along which the cargo bed rotates as it is extended rearwardly and perpendicular to the pivot axis.

The lifting arms 24, which are pivotally attached via brackets 27 to the cargo bed 25, slide rearwardly with the cargo bed until their rear ends come to rest on catches 23. In FIG. 3A, the cargo bed 25 has moved even further rearwardly than the point at which the lifting arms 24 come in contact with the catches 23. The catches 23 function similarly to pole vault boxes, whereby the front ends of the lifting arms 24 are forced to rise as the rear ends of the arms pivot at the catches. In FIG. 3A, the front ends of the lifting arms 24, which are pivotally attached to the brackets 27 of the cargo bed 25, have lifted the front end of the cargo bed as the rear ends of the lifting arms pivot about the catches 23. As the front end of the cargo bed 25 is raised and its rear end slides rearwardly beyond the point at which its rear end is proximate to the rear end of the support member 22, the bottom surface of the cargo bed slides on a pivot axis 44 formed by the rear upper edge of the support member. And the rear end 45 of the bottom surface of the cargo bed falls below the plane formed by the support member.

Figure 4A:
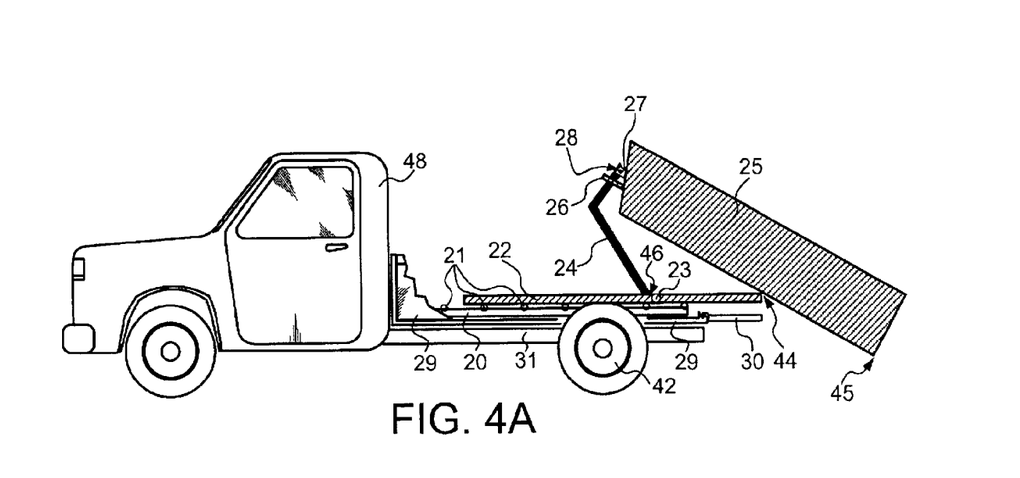
Figure 4B:
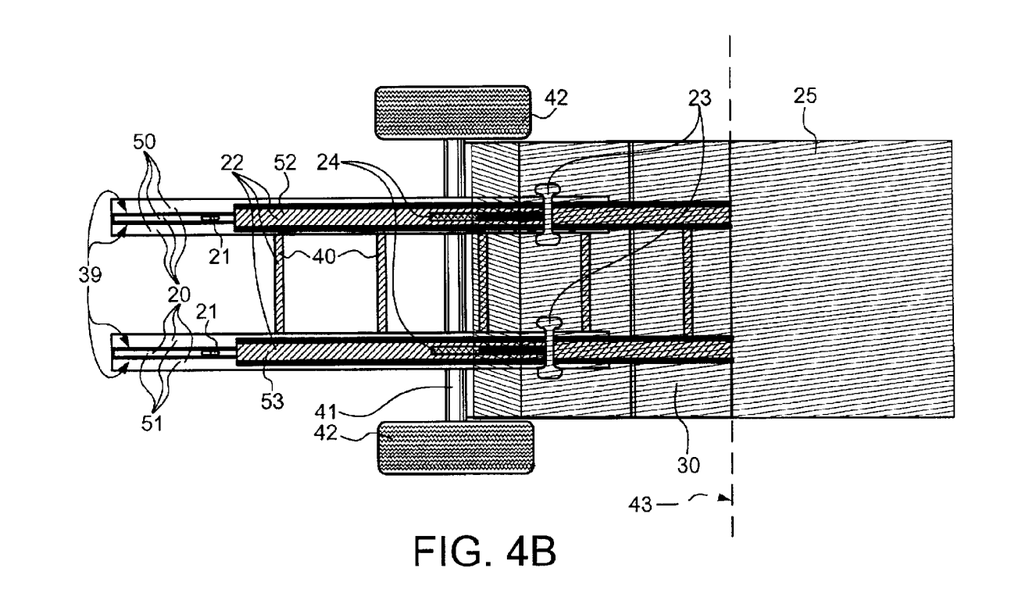

In FIG. 4A, the cargo bed 25 has continued to slide rearwardly so that the pins 28 that pivotally attach the lifting arms 24 to the brackets 27 on the cargo bed are nearly directly above the pivot points 46 formed at the junction of the lifting arms and the catches 23. The cargo bed 25 rests on a pivot axis 44 that has moved farther to the front end of the cargo bed as the cargo bed has slide rearwardly. The rearward movement of the cargo bed 25 is stopped when the lifting arms 24 rotate about the pins 28, slide forward through the guides 26, and bump up against the fronts of the guides, which limit the arc of movement of the lifting arms.

As the cargo bed 25 slides rearwardly, it rests on a pivot axis 44 that moves closer to the cargo bed's center of gravity. Consequently, the force required to lift the front end of the cargo bed decreases. Moreover, by moving the pivot axis closer to the cargo bed's center, the length of the lifting arm required to tilt the cargo bed to any given inclination angle is reduced. Because little external force is required to roll the cargo bed 25 along the substantially horizontal truck bed or to tilt the cargo bed about an axis over which the cargo bed can be substantially balanced, the load transfer system is much easier to use than prior art systems. Moreover, as described below, the reduced force allows the load transfer system to be operated with a pulley powered by an electric motor or hand crank, although a typically more powerful, costly and cumbersome hydraulic system can alternatively be used. The low-cost load transfer system is ideal for use with small vehicles to transfer garden clippings and yard debris.

Figure 5:
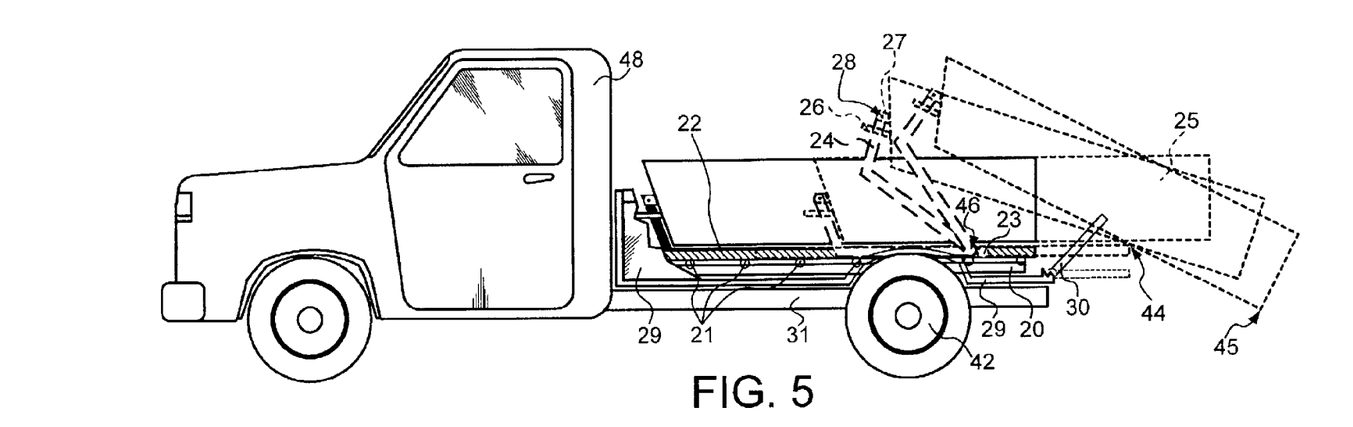
FIGS. 5 and 6 are partial cut-away side views of a pickup truck showing the movable support member and slidable cargo bed in various superimposed extended positions and angles of inclination that might be used in an embodiment to unload debris or building material.
Figure 6:
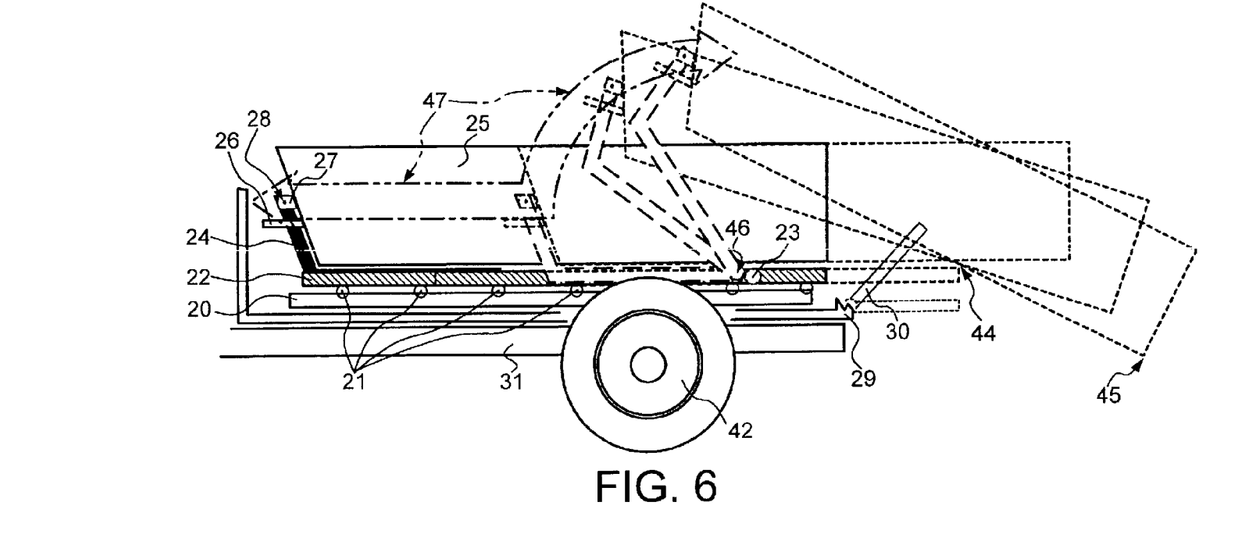

As illustrated in FIGS. 5 and 6, the motion of the front end of the cargo bed 25 is first in a purely rearward direction and then rearwardly in an arc centered on the pivot point 46 formed at the junction of each lifting arm and the corresponding catch 23. The arrow 47 shown in dashed lines in FIG. 6 illustrates this motion.

In the illustrated embodiment, the catches 23 are pins placed through the upper grooves of the support member 22. The catches 23 and pivot points 46 for the lifting arms 24 move with the support member 22 as it slides along the frame 20. In an alternative embodiment, the lifting arms 24 slide in grooves that are part of the frame 20. The alternative embodiment is stable because the lifting arms 24 slide in grooves that are not themselves sliding. The alternative embodiment has the disadvantage that the pivot points 46 for the lifting arms 24 do not extend rearwardly beyond the rear end of the frame 20, and the cargo bed 25 does not extend rearwardly to the extent of the illustrated embodiment.

Figure 7:
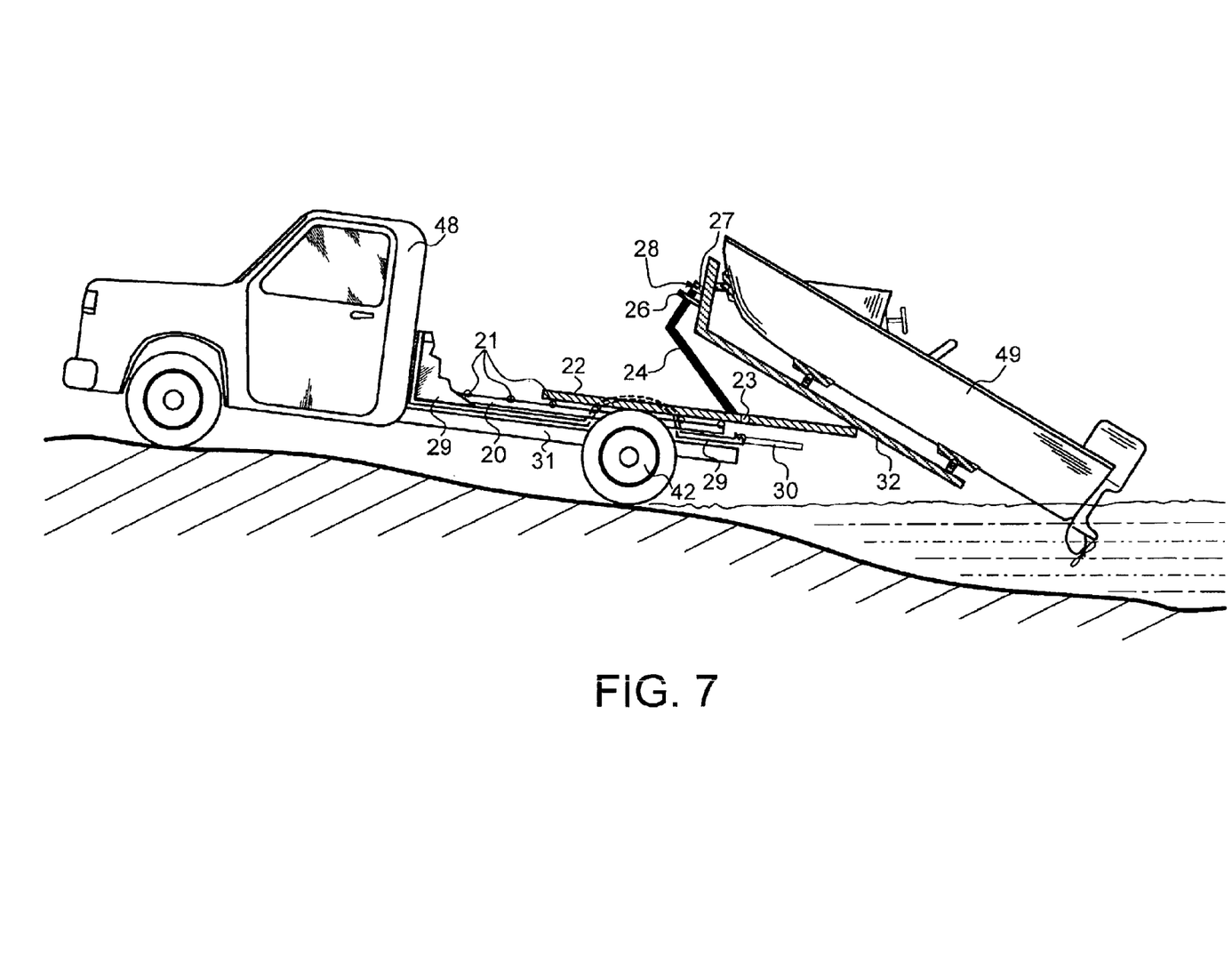
FIG. 7 is a partial cut-away side view of a pickup truck and the exposed load transfer system extended to unload a boat into water.

FIG. 7 shows the load transfer system extended to a length conducive to unloading and loading a boat 49 into a body of water. The extended length of the support member 22 enables wheels 42 to remain on dry pavement while the boat carrier 32 (modified cargo bed 25) is lowered toward the surface of the water. In one embodiment, the boat 49 is attached to the front end of the boat carrier 32 by a winch and cable (not shown) so that, as the boat slides into the water, it does not float away because it is no longer held by gravity to the boat carrier. The boat 49 can be loaded onto the boat carrier 32 by reversing the above-described procedure.

Figure 8:
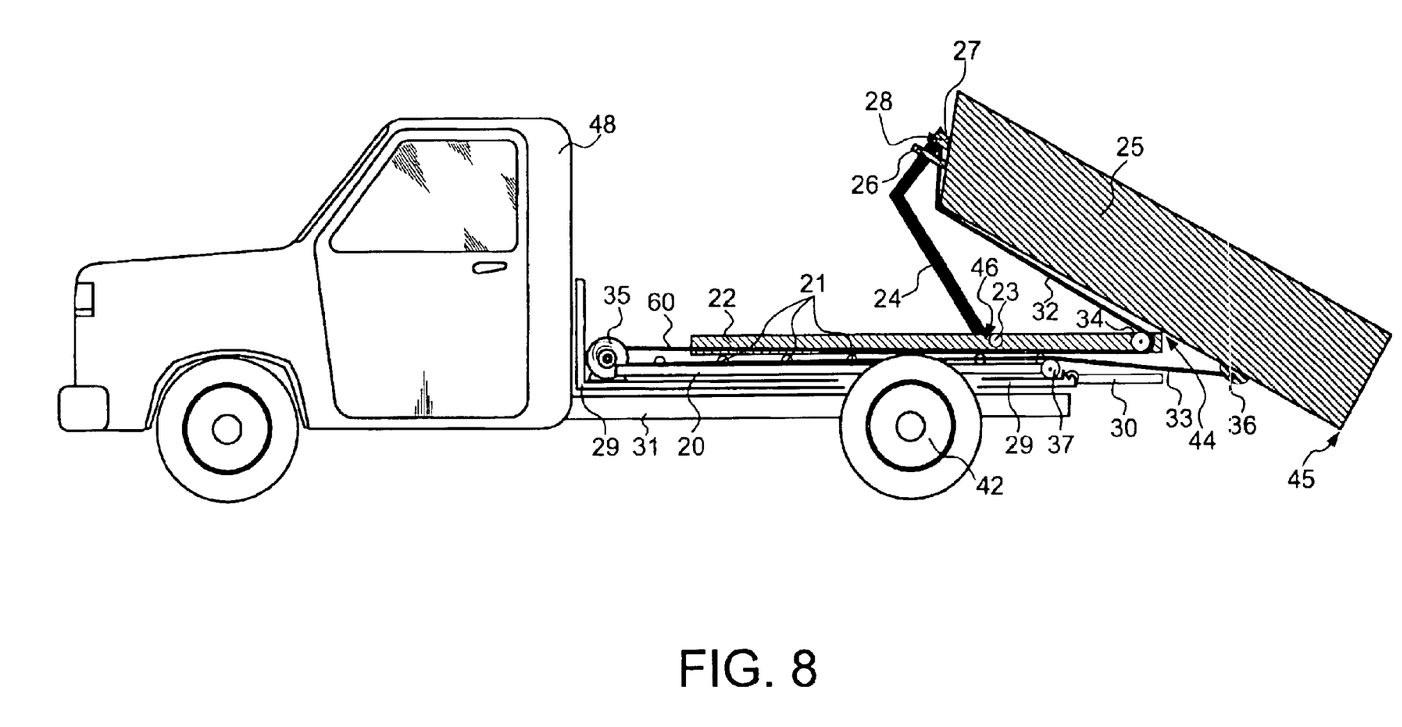
FIG. 8 is a partial cut-away side view of a pickup truck and the exposed load transfer system showing a mechanism for enabling the rearward extension and the retraction of the cargo bed.

FIG. 8 shows a mechanism for enabling the rearward extension of the cargo bed 25 and the retraction of the cargo bed back into the truck bed 29. In the illustrated embodiment, rearward extension is accomplished using a cable 32 that connects to the pins 28 on the brackets 27 and runs along the bottom surface of the cargo bed 25, over a wheel 34 that is attached near the rear end of the support member 22, and then around a spool 35 at the front end of the truck bed 29. The wheel 34 acts as a moving pulley, providing mechanical advantage that allows movement of the cargo bed 25 with reduced force.

The retraction is accomplished by a second cable 33 wound in the opposite direction around the spool 35 and that is connected to a point 36 under the bottom surface of the cargo bed 25 proximate to the rear end of the cargo bed. The second cable 33 runs over a wheel 37 attached proximate to the end of the frame 20 so that the cable 33 does not rub on the edge of the frame when the cargo bed 25 is in an inclined orientation. The spool 35 can be powered by a hand winch or an electric motor. In one embodiment, the spool 35 has one section with a diameter larger than that of a second section. The first cable 32 wraps around the spool section with the larger diameter, and the second cable 33 wraps around the spool section with the smaller diameter. This enables the first cable 32 to be retracted and extended from the spool at a faster rate than the second cable 33 is extended and retracted, respectively, as the cargo bed 25 is extended rearwardly and retracted, respectively.

The retraction of the cargo bed 25 is assisted by the force of gravity as the weight of the cargo bed causes the cargo bed to fall forward along the arc (see FIG. 6) formed about the pivot points 46 in front of the catches 23 as the cargo bed rests on the diagonally-oriented lifting arms 24.

In an alternative embodiment, the spool of a winch or motor is attached under the rear end of the chassis 31 of a truck. The first cable connects the pins 28 at the front end of the cargo bed 25 directly to the spool. The second cable connects a point 36 under the bottom surface of the cargo bed 25 to the spool by running over a wheel at the front end of the frame 20. In this alternative embodiment, an electric motor might come in contact with water if the truck backs into water to lower a boat using the load transfer system.

Although the load transfer mechanism has been described as attached to a pickup truck bed, the cargo bed or carrier can instead be attached to a vehicle without a pickup truck bed. Moreover, the load transfer system can be used as a toy, such as a toy dump truck.

The mechanism for extending and retracting the cargo bed 25 in one embodiment is a hand winch with a gear at the position of the spool 35 in FIG. 8. In this case, a single chain runs from a point 36 under the bottom surface of the cargo bed 25, over the gear, around a wheel 34, and connects to pins 28 on brackets 27. A spring segment is included as part of the chain to keep the chain taut over the gear and to compensate for the greater expansion of the chain length corresponding to cable 32 relative to the contraction of the chain length corresponding to cable 33 as the cargo bed 25 is extended rearwardly.

Although the invention has been described in conjunction with specific embodiments, many variations, modifications and alternatives will be apparent to those skilled in the art as a result of this disclosure. It is intended that all such variations, modifications and alternatives are included herein that fall within the scope and intent of the appended claims.

What is claimed is:

1. An apparatus for transferring a load, the apparatus comprising:

a support member coupled to a frame, the support member having a front edge, a rear edge and an upper surface, the support member moveable in a first direction relative to the frame;

a bed movable adjacent to the upper surface of the support member, the bed having a front end, a rear end, and a point disposed between the front end and the rear end, the point moveable along the first direction between first and second locations over the upper surface of the support member, the bed pivotable about an axis disposed adjacent to the rear edge of the support member, the axis oriented substantially perpendicular to the first direction; and at least one arm having a first end and a second end, the first end moveable along the support member and the second end coupled to the bed adjacent to the front end of the bed, to raise the front end of the bed as the point approaches the second location.

2. The apparatus of claim 1, wherein:

the axis is disposed adjacent to a point located approximately halfway between the front end and the rear end of the bed as the front end of the bed is raised.

3. The apparatus of claim 1, wherein:

the bed fits within a pickup truck.

4. The apparatus of claim 1, wherein:

the bed fits within a vehicle having a tailgate that is moveable between open and closed positions, the tailgate having a rear edge in the open position; and the axis is disposed adjacent to the rear edge of the tailgate.

5. The apparatus of claim 1, wherein:

the bed is coupled to a simple machine to move the bed along the first direction.

6. The apparatus of claim 1, wherein:

the bed is coupled to at least one wheel to roll on the support member.

7. The apparatus of claim 1, wherein:

the bed is coupled to at least one pulley to move the bed along the first direction.

8. The apparatus of claim 1, wherein the bed is a cargo bed.

9. The apparatus of claim 1, wherein the bed is a boat carrier.

* * * * *